United States Patent
Ellis et al.

(10) Patent No.: US 11,037,018 B2
(45) Date of Patent: Jun. 15, 2021

(54) NAVIGATION AUGMENTATION SYSTEM AND METHOD

(71) Applicant: Rosemount Aerospace Inc., Burnsville, MN (US)

(72) Inventors: David Ellis, Plymouth, MN (US); Shannon Roberts, Burnsville, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/379,210

(22) Filed: Apr. 9, 2019

(65) Prior Publication Data

US 2020/0327355 A1 Oct. 15, 2020

(51) Int. Cl.
*G06K 9/46* (2006.01)
*G06K 9/62* (2006.01)
*G06T 7/20* (2017.01)

(52) U.S. Cl.
CPC ......... *G06K 9/4671* (2013.01); *G06K 9/6288* (2013.01); *G06T 7/20* (2013.01)

(58) Field of Classification Search
CPC ................................. G06K 9/6288; G06T 7/20
See application file for complete search history.

(56) References Cited

U.S. PATENT DOCUMENTS

| | | |
|---|---|---|
| 6,072,889 A | 6/2000 | Deaett et al. |
| 2017/0023937 A1 | 1/2017 | Loianno et al. |
| 2018/0087907 A1* | 3/2018 | DeBitetto .............. G01C 21/30 |
| 2018/0299228 A1 | 10/2018 | Naftel |

FOREIGN PATENT DOCUMENTS

| | | |
|---|---|---|
| EP | 3049821 B1 | 1/2019 |
| WO | 2014130854 A1 | 8/2014 |

OTHER PUBLICATIONS

Extended European search report issued in corresponding EP application No. 19214594.4, dated Jul. 24, 2020.

* cited by examiner

*Primary Examiner* — Edward Park
(74) *Attorney, Agent, or Firm* — Locke Lord LLP; Scott D. Wofsy; Georgi Korobanov

(57) ABSTRACT

A navigation augmentation system includes a vehicle including an imaging device operably connected to a navigation data fusion module for receiving and analyzing visual point of interest data, gyroscope data, and accelerometer data, wherein the navigation data fusion module is operably connected to a sensor compensation module and an autopilot module for controlling the navigation of the vehicle.

6 Claims, 2 Drawing Sheets

NAVIGATION AUGMENTATION SYSTEM AND METHOD

BACKGROUND

Technological Field

The present disclosure relates to a navigation augmentation system, and more particularly to a navigation augmentation system without using GPS.

Description of Related Art

A variety of devices are known in the navigation systems for vehicles. Precision guided munitions require accurate estimates of position, velocity, and attitude in order to hit a designated target. Current weapon systems rely on GPS and high cost IMUs. The new paradigm for precision guided munitions is GPS-denied, low cost and volume IMUs, and maximum airframe performance. This patent eliminates major IMU error sources and enables use of IMUs with lower cost and volume than would otherwise be required.

The conventional methods and systems have generally been considered satisfactory for their intended purpose. However, there is still a need in the art for low-cost navigation systems operating in a GPS-denied environment but maintaining accurate position, velocity, and attitude estimates, which in turn improve seeker target acquisition capabilities. There also remains a need in the art for such systems and components that are economically viable. The present disclosure may provide a solution for at least one of these remaining challenges.

SUMMARY OF THE INVENTION

A navigation augmentation system includes a vehicle, such as an aircraft, missile or projectile, including an imaging device operably connected to a navigation data fusion module configured for receiving and analyzing visual point of interest data, gyroscope data, and accelerometer data, wherein the navigation data fusion module is operably connected to a sensor compensation module and an autopilot module for controlling navigation of the vehicle. The accelerometer and the gyroscope can also be directly and operably connected to the sensor compensation module. The navigation data fusion module can include a Kalman filter.

The imaging device can include a series of cameras which can be interconnected or independent of each other, each communicating with the navigation data fusion module. Each imaging device can include a horizon sensor.

A method of augmenting navigation of a vehicle is also disclosed. The method includes updating a vehicle control command due to receiving data from an autopilot module and data from sensors compensation module for controlling a direction of travel of a vehicle wherein the sensor compensation module receives bias and scale factor error estimates for a gyroscope and bias and scale factor error estimates for an accelerometer from a navigation data fusion system wherein the navigation data fusion system receives and aggregates input from an integrator for a gyroscope, an integrator for an accelerometer, and an imaging device, and the vehicle changes direction based on the navigation updates. Roll and pitch of the vehicle can be determined by the imaging device when used as a horizon sensor, and can be used as inputs to the navigation data fusion system. The roll and pitch of the vehicle can be coupled with the visual points of interest data as an input to the data fusion system.

The imaging device can detect at least one point of interest in a first image and track the point of interest in a second image using an algorithm. The algorithm can be a SIFT (Scale Invariant Feature Transform), FAST (Features from Accelerated Segment Test) algorithm, or similar algorithm.

The method described above is intended to be used in areas where GPS data is inaccessible or intermittently accessible; as such the bias and scale factor error estimates are calculated without using GPS data, and specifically the vehicle can operate in a GPS denial area.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
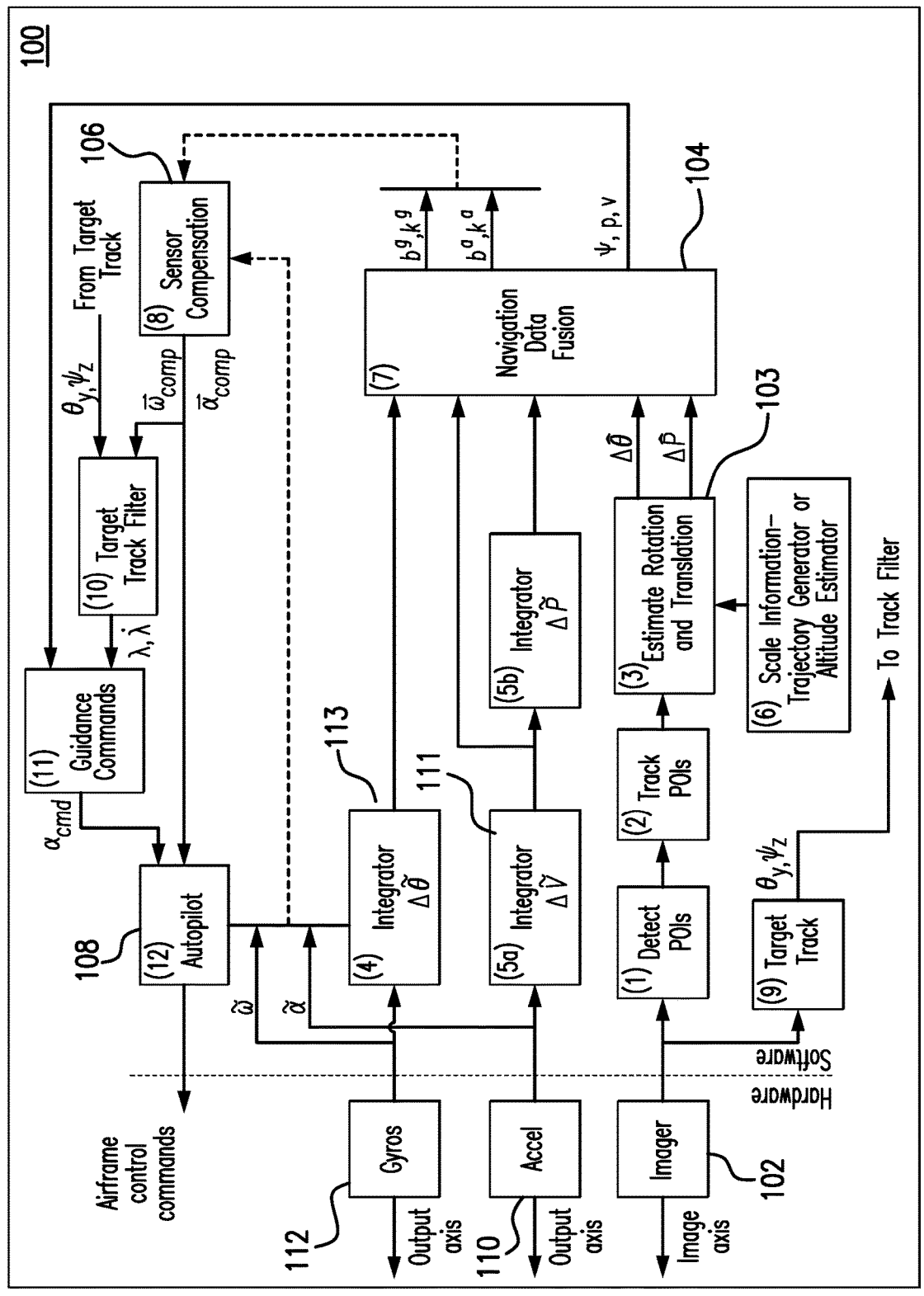
FIG. 1 is a schematic view of a navigation augmentation system.

Reference will now be made to the drawings wherein like reference numerals identify similar structural features or aspects of the subject invention. For purposes of explanation and illustration, and not limitation, a partial view of an exemplary embodiment of a navigation augmentation system in accordance with the invention is shown in FIG. 1 and is designated generally by reference character 100. The methods and systems of the invention can be used to bound the change in position and attitude by estimating the bias and scale factor errors of the accelerometers and gyroscopes of a vehicle in flight.

During flight, the imaging seeker is used to capture images at fixed intervals. Each recorded image is scanned for points of interest (POI) which can be tracked or matched in successive images. Given many such points, a least-squares estimate of the camera's change in roll, pitch, yaw, and translation direction can be calculated for each pair of images. The translation direction vector must be multiplied by a scaling factor, $\alpha$, which can be determined using an additional information source, i.e. an altimeter, velocity, or position measurement within the image. These can be used as aiding information to enhance navigation estimates.

A navigation augmentation system 100 includes a vehicle 101, specifically an airborne vehicle such aircraft or a munition, including an imaging device 102 operably connected to a navigation data fusion module 104 configured for receiving and analyzing delta rotations and delta translations (from block 3), gyroscope data, and accelerometer data. The navigation data fusion module 104 is operably connected to a sensor compensation module 106 and an autopilot module 108 for controlling the vehicle 101. An accelerometer 110 and a gyroscope 112 are also directly and operably connected to the sensor compensation module 106. The navigation data fusion module 104 could be implemented as a Kalman filter.

The imaging device 102 can include a series of cameras which can be interconnected or independent of each other, each with independent translation/rotation estimation modules ((1)-(3)), each providing delta translation/rotation angles to the navigation data fusion module 104. Each imaging device can be used as a horizon sensor.

A method of augmenting navigation of a vehicle is also disclosed. Any feature detection method that provides a list of unique points can be used, so long as the same point can be detected or tracked in the second image, i.e. the FAST or the SIFT algorithm. The output of an imaging collection can be a matrix of points, p in homogeneous coordinates:

$$p = \begin{bmatrix} p_{1x} & p_{2x} & \cdots & p_{nx} \\ p_{1y} & p_{2y} & \cdots & p_{ny} \\ 1 & 1 & \cdots & 1 \end{bmatrix}$$

Where $p_{nx}$ is the pixel column of the $n^{th}$ point and $p_{ny}$ is the pixel row of the $n^{th}$ point. Each of these homogeneous points can be treated as a 3-dimensional pointing vector from the optical center of the camera towards the point in 3D space, where the camera is at the origin and its center pixel points along the Z axis, where the X axis aligns to the image rows and the Y axis aligns to the image columns.

For each of the points identified in the first image, a matching point must be located in the second image. In the case where there is relatively little motion between successive camera frames, as in a high frame-rate video stream, the points can be located using a tracking algorithm. One method for tracking is to consider a small region of pixels around the POI of the first image and search the second image for the nearby region with the highest correlation:

$$[p'_x \ p'_y] = \underset{x,y}{\mathrm{argmax}} \sum_R I(p_x, p_y) I'(x, y)$$

Where:
$p_x'$ and $p_y'$ are the corresponding column and row of point p in the second image
R is a small region of pixels around p
I is the first image
I' is the second image
Other methods, such as the method above but with a Kalman filter, or the Kanade-Lucas-Tomasi (KLT) tracker can be used. As an alternative to feature tracking, feature matching can also be performed.
The output of this step is a second matrix of points, p' in homogeneous coordinates:

$$p' = \begin{bmatrix} p'_{1x} & p'_{2x} & \cdots & p'_{nx} \\ p'_{1y} & p'_{2y} & \cdots & p'_{ny} \\ 1 & 1 & \cdots & 1 \end{bmatrix}$$

Where a correspondence between the points is maintained via indices. If a matching point cannot be located in the second image, it is removed from the list.

Figure 2:
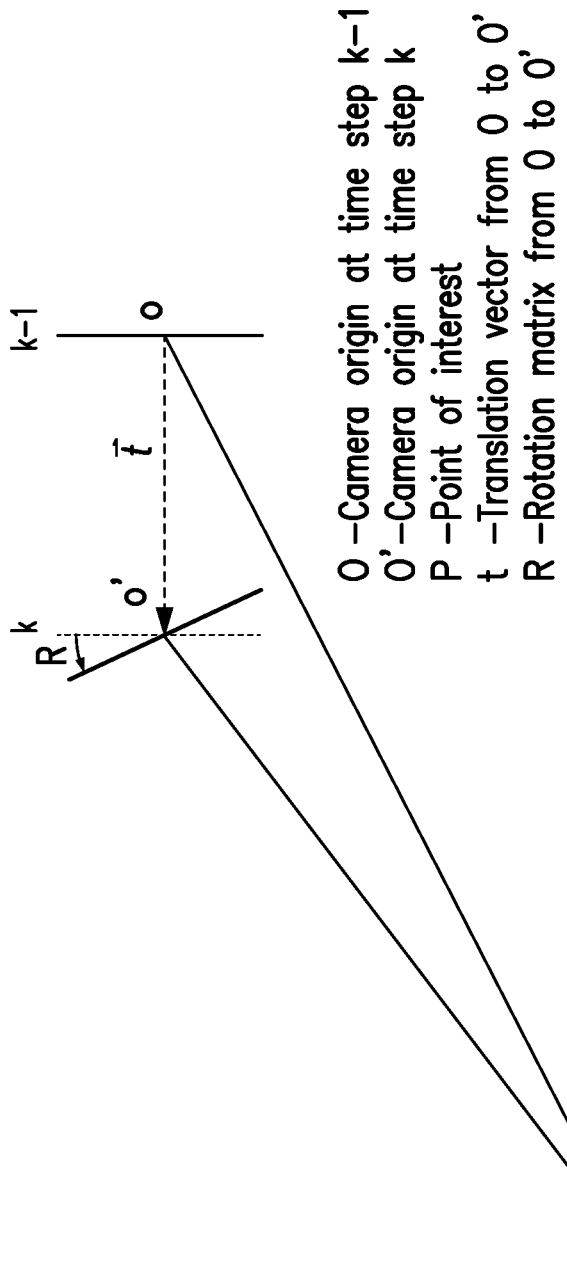
FIG. 2 is a 2-D Camera Rotation/Translation Diagram for the navigation augmentation system of FIG. 1.

As shown in FIG. 2, for every point in 3-dimensional space that is observed from two different camera locations, a plane can be defined using the point P, and the optical centers (lenses) of each camera—O and O'.

The line OO' is the direction of translation between frames k and k+1, and the lines OP and O'P are the lines connecting each camera's optical center to the point in 3-dimensional space. Since these points define a plane, the following relation holds:

$$\vec{OP} \cdot [\vec{OO'} \times \vec{O'P}] = 0$$

This can be re-written using the coordinates of the first camera as:

$$p \cdot [t \times (Rp')] = 0$$

Where t is the translation and R is the rotation matrix from the second camera orientation to the first camera orientation. The essential matrix is defined as:

$$\varepsilon = [t \times] R$$

Where [t×] is the skew symmetric form of t, which is the implementation of the cross-product with a matrix multiplication. The essential matrix is defined using normalized camera coordinates, accounting for the camera's intrinsic parameters (focal length, etc.) The transformation between the essential matrix and the fundamental matrix is linear:

$$\mathcal{F} = K^{-T} \varepsilon K^{-1}$$

Where K is the camera calibration matrix. This will be defined and handled in the following step. For the moment, for each point (defined in pixel coordinates) that exists in both images, the following relation holds:

$$p^T \mathcal{F} p' = 0$$

Using the set of point correspondences acquired in the previous steps, a least-squares estimate of the fundamental matrix can be computed, which contains the desired rotation and translation information.

The equation can be rewritten to allow for a solution using standard linear least-squares optimization techniques:

$$[x \ y \ 1] \begin{bmatrix} \mathcal{F}_{11} & \mathcal{F}_{12} & \mathcal{F}_{13} \\ \mathcal{F}_{21} & \mathcal{F}_{22} & \mathcal{F}_{23} \\ \mathcal{F}_{31} & \mathcal{F}_{32} & \mathcal{F}_{33} \end{bmatrix} \begin{bmatrix} x' \\ y' \\ 1 \end{bmatrix} = 0$$

This is a system of nine homogeneous linear equations:

$$UF = 0$$

Where $$U = \begin{bmatrix} x1x1' & x1y1' & x1 & y1x1' & y1y1' & y1 & x1' & y1' & 1 \\ x2x2' & x2y2' & x2 & y2x2' & y2y2' & y2 & x2' & y2' & 1 \\ \vdots & \vdots & \vdots & \vdots & \vdots & \vdots & \vdots & \vdots & \vdots \\ xnxn' & xnyn' & xn & ynxn' & ynyn' & yn & xn' & yn' & 1 \end{bmatrix}$$

And $$F = [\mathcal{F}_{11} \mathcal{F}_{12} \mathcal{F}_{13} \mathcal{F}_{21} \mathcal{F}_{22} \mathcal{F}_{23} \mathcal{F}_{31} \mathcal{F}_{32} \mathcal{F}_{33}]^T$$

The fundamental matrix can now be estimated using standard linear least-squares techniques. The fundamental matrix estimate does not account for the camera's focal length, focal center, and pixel size, however, it is linearly related to the desired essential matrix:

$$\varepsilon = K^T \mathcal{F} K'$$

Where K is the camera calibration matrix, and predetermined, or sometimes called the intrinsic matrix, is defined as:

$$K = \begin{bmatrix} f & 0 & c_x \\ 0 & f & c_y \\ 0 & 0 & 1 \end{bmatrix}$$

Where f is the focal length expressed in number of pixels and $c_x$ and $c_y$ are the pixel column and row aligned with the lens's optical axis.

To extract the rotation and translation vectors from the essential matrix, the singular value decomposition is utilized:

$$\varepsilon = UWV^T$$

Where U and V are rotation matrices and W is a diagonal matrix containing the singular values. Due to the defined constraints of the essential matrix, it must have rank 2, and therefore only contain 2 singular values. This means that the third column of U defines the null space of ε. Since ε is defined as the product of one rotation matrix and one skew-symmetric matrix representing the translation vector, the vector t' is the null space of ε and therefore the $3^{rd}$ column of U. It is only defined by its direction, and at the moment it could be positive or negative.

There are also two possibilities for the rotation matrix R depending on the ordering of the first two columns of U. Using the four total combinations of R and t', only one of these will result in the points being in front of the camera in both positions, and this provides the estimate of R and t'. The translation vector t', is a unit vector, therefore the scaling factor, α, must be multiplied by t' in order to have a properly scaled delta relative position.

$$t = \alpha t'$$

This information can then be used to extract the delta attitude and delta relative position between frames, which can then be applied as an aiding source to a navigation algorithm.

The method includes updating a vehicle control command from an autopilot module 108 and data from sensors compensation module 106 for controlling a direction of travel of a vehicle wherein the sensor compensation module 106 receives bias and scale factor error estimates for a gyroscope 112 and bias and scale factor error estimates for an accelerometer 110 from a navigation data fusion system 104 wherein the navigation data fusion system 104 receives an aggregate input from an integrator for a gyroscope 113, an integrator for an accelerometer 111, and an imaging device 102, and the vehicle changes direction based on the navigation updates. Change in position, velocity and attitude of the vehicle are determined by the accelerometer and the gyroscope integrators and used as inputs to the navigation data fusion system. The visual points of interest data are processed to estimate delta translation and rotation of the imager, which is used as an input to the data fusion system. The data fusion system uses the delta attitude and delta relative positions to compare to the attitude and position changes estimated by the gyroscope and accelerometers. The difference between the two is specified as bias and scale factor error of the gyroscope and accelerometers, as the imaging device has bias-free error characteristics. The sensor fusion module uses these error terms to compensate the gyroscope and accelerometer outputs. This gives the compensated gyroscope output ($\omega_{comp,1}^b$) and compensated accelerometer output ($\alpha_{comp,1}^b$) as:

$$\omega_{comp,1}^b = \frac{\omega_{out,1}^b - b_1^g}{k_1^g}$$

$$a_{comp,1}^b = \frac{a_{out,1}^b - b_1^a}{k_1^a}$$

The imaging device 102 can detect at least one point of interest in a first image and track the point of interest in a second image. The detection algorithm can be the SIFT or the FAST algorithm. The system uses an imaging seeker to track multiple distinguishable terrain features (i.e. rivers, lakes, roads, shoreline, rock formations, vegetation, etc) which are assumed to be on the surface, and inertially fixed. An imaging sensor provides angle-only measurements (with respect to the body) to each feature. Tracking these features allows delta-position, delta-attitude, and velocity to be bounded while navigating via dead-reckoning by using features as an aid to navigation.

This system and method enhance integrated guidance units to operate by improving attitude and position estimates and seeker acquisition capabilities. The systems allows for using small, low cost sensors, which can be calibrated post launch. This system and method disclosed above remove gyro and accelerometer scale factor and bias, which are major error sources of low cost units, and improve navigation, airframe stability, and guidance accuracy.

The method described above is intended to be used in areas where GPS data is inaccessible or intermittently accessible, as such the bias and scale factor error estimates are calculated without using GPS data.

The methods and systems of the present disclosure, as described above and shown in the drawings, provide for flight systems with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

The invention claimed is:
1. A navigation augmentation system comprising:
 a vehicle including an imaging device comprising a plurality of cameras operably connected to a navigation data fusion module configured for receiving and analyzing visual point of interest data, gyroscope data, and accelerometer data;
 wherein the navigation data fusion module is operably connected to a sensor compensation module and an autopilot module for controlling the navigation of the vehicle, and the imaging device collects imaging data including a matrix of points, p in homogeneous coordinates:

$$p = \begin{bmatrix} p_{1x} & p_{2x} & \cdots & p_{nx} \\ p_{1y} & p_{2y} & \cdots & p_{ny} \\ 1 & 1 & \cdots & 1 \end{bmatrix}$$

where $p_{nx}$ is a pixel column of an $n^{th}$ point and $p_{ny}$ is a pixel row of the $n^{th}$ point and wherein a region of pixels around a point of interest of a first image and a second image includes:

$$[p'_x \ p'_y] = \underset{x,y}{\mathrm{argmax}} \sum_R I(p_x, p_y) I'(x, y)$$

where:
$p_x'$ and $p_y'$ are corresponding column and row of point p in the second image,
R is the region of pixels around p,
I is the first image, and
I' is the second image.

2. The navigation augmentation system of claim 1, wherein the accelerometer is operably connected to the sensor compensation module.

3. The navigation system of claim 1, wherein the gyroscope is operably connected to the sensor compensation module.

4. The navigation system of claim 1, wherein navigation data fusion module includes a Kalman filter.

5. The navigation system of claim 1, wherein the imaging device includes a series of independent cameras.

6. The navigation system of claim 1, wherein the imaging device includes a horizon sensor.

\* \* \* \* \*